United States Patent [19]

Rosen et al.

[11] 4,021,677

[45] May 3, 1977

[54] HYBRID POWER SYSTEM

[75] Inventors: Charles Rosen, Teaneck, N.J.; Victor Wouk, New York, N.Y.

[73] Assignee: Petro-Electric Motors, Ltd., New York, N.Y.

[22] Filed: Mar. 3, 1975

[21] Appl. No.: 554,745

[52] U.S. Cl. .................................. 290/40 R; 290/51; 180/65 A
[51] Int. Cl.² .................................. B60K 13/00
[58] Field of Search ............... 290/3, 4, 14, 17, 31, 290/34, 40, 45, 50, 51; 180/65 A

[56] References Cited

UNITED STATES PATENTS

| | | | |
|---|---|---|---|
| 3,525,874 | 8/1970 | Toy | 290/14 |
| 3,791,473 | 2/1974 | Rosen | 180/65 A |
| 3,861,484 | 1/1975 | Joslin | 180/65 A |
| 3,904,883 | 9/1975 | Horwinski | 290/50 |

*Primary Examiner*—Gene Z. Rubinson
*Assistant Examiner*—W. E. Duncanson, Jr.
*Attorney, Agent, or Firm*—Gottlieb, Rackman & Reisman

[57] ABSTRACT

There is disclosed a heat-engine/battery-electric hybrid power system for use in a low-pollution, low-fuel consumption vehicle. The engine shaft is coupled by a fixed mechanical ratio to the shaft of a dynamotor, the field current of the dynamotor being controlled by the accelerator pedal for drawing power from a battery to aid the engine in the turning of the driveshaft or for drawing power from the driveshaft to recharge the battery. A feedback loop is employed for continuously adjusting the throttle so that the manifold vacuum remains constant. In this manner, the ratio of the engine exhaust to the driveshaft speed remains substantially constant. The engine exhaust is directed to a thermal reactor, secondary air for which is derived from an air pump driven by the engine shaft. The ratio of the exhaust gas to the secondary air is thus substantially constant independent of the shaft speed so that the thermal reactor is maximally effective at all vehicle speeds. To control further the proper operation of the thermal reactor, the temperature of the burning gases in the reactor can be maintained constant by a second feedback loop which varies the fuel/air ratio.

36 Claims, 5 Drawing Figures

HYBRID POWER SYSTEM

This invention relates to heat-engine/battery-electric hybrid power systems, and more particularly to vehicles employing such system which exhibit low pollution and low fuel consumption.

It has long been recognized that vehicles equipped with internal combustion engines are a major source of air pollution, particularly in urban areas. It is also well known that such engines are relatively inefficient from the standpoint of fuel consumption, also particularly in urban areas. There have been various proposals for solving both problems, but no satisfactory system has yet been devised for solving both problems in a "high performance" vehicle, that is, one which is capable of rapid acceleration and high speed. Efforts to reduce the pollution emitted from the tailpipe of a vehicle employing a combustion engine (which term, as used herein, refers to all types of combustion engines, including internal combustion, Rankine and Stirling cycle engines, turbines, etc.) by constructing the engine so that it is inherently "clean" have generally met with failure. In an internal combustion engine, for example, the walls of the compartments (e.g., cylinders) in which the moving, work-producing elements operate, must of necessity be below fuel-burning temperature; otherwise the walls cannot be lubricated. Thus in an internal combustion engine, there may always be a layer of unburned gasses in the form of HC and CO which adhere to the walls and which are scraped off into the exhaust during the exhaust stroke.

Most efforts at pollution control have therefore centered around the elimination of the pollutants from the engine exhaust. The most popular technique at the present time is the use of catalytic converters. The unburned elements in the engine exhaust are burned by introducing additional air, known as "secondary air", into the exhaust and having the burning take place at a comparatively low temperature in the presence of a catalyst. But catalytic converters are not only expensive, they are easily contaminated or "poisoned" by materials such as lead.

Another pollution-control approach is to place a small furnace, known as a thermal reactor, in the exhaust of the engine. Under proper high-temperature operating conditions, and if specified amounts of secondary air are introduced into the thermal reactor, the unburned HC and CO will burn to harmless carbon dioxide and water vapor. But experiments with thermal reactors have also not been fully successful; it has been found that a typical thermal reactor is effective over only a narrow range of ratios of engine exhaust volume to secondary air volume. Over the wide ranges of vehicle speeds and loads which are normally encountered, it has in the past been exceedingly difficult to supply a varying amount of secondary air such that the ratio of engine exhaust volume to secondary air volume is relatively constant for rapidly changing exhaust volumes.

It has been recognized that while a combustion engine is generally not powerful at low rotational speeds but develops high power at high speeds, an electric motor develops maximum torque at low speeds when high torque is necessary for acceleration. Thus numerous investigators have been led to consider the construction of hybrid vehicles in which a combustion engine and an electric motor complement each other. The engine is usually operated under a restricted set of conditions, it thus being possible to adjust the engine to operate at maximum efficiency and for lowest possible emissions. (A typical engine can be adjusted for optimum performance for any given set of conditions.) When additional power for the drive shaft beyond the capability of the engine is required, the motor can be operated by the vehicle batteries; and during periods when little power is required, the engine can be used to recharge the batteries. Two general types of hybrid vehicles have been proposed — "series" and "parallel".

In a series hybrid, the engine does not drive the wheels directly. Instead, the engine drives a generator which charges a battery. The battery is used to operate a motor, which in turn drives the wheels. Even though in a series hybrid the engine is operated at a more or less constant speed and load, the overall power train may be relatively inefficient. This is because there are substantial losses of power in transforming all of the power output of the engine into electrical power, and then having the motor convert all of the electrical power into mechanical power.

In the parallel hybrid, on the other hand, the engine, as well as the motor is coupled to the transmission system. In the usual case, a variable ratio transmission system is employed which allows all or only some of the power generated by the engine to go directly through the mechanical transmission system to the drive shaft. During periods of acceleration, the motor aids the engine in driving the wheels. During idling, or other periods when little drive power is required, the excess energy output of the engine is used to recharge the batteries. The system is parallel in the sense that the motor and the engine can both impart mechanical energy directly to the drive shaft. Because the engine can be operated under restricted conditions, low emissions and good fuel economy are possible. However, for the most part, the parallel hybrid concept has not resulted in a satisfactory vehicle either. The main reason for this is that the transmission system which is required is highly complex and expensive; it must convert a constant-speed, constant-power engine operation into a variable-speed, variable-load drive operation.

Perhaps the "best" prior art parallel hybrid is that disclosed in Rosen U.S. Pat. No. 3,791,473 which issued on Feb. 12, 1974 and is entiltled HYBRID POWER TRAIN. The Rosen parallel hybrid vehicle employs a dynamotor — a DC machine which can be used as a DC motor or a DC generator. (As used herein, the term "dynamotor" refers to any device which can be used both as a motor and a generator.) The dynamotor is coupled by a fixed ratio mechanical linkage to the engine drive shaft. The accelerator pedal is used to vary the field current of the dynamotor. During acceleration of the vehicle the dynamotor is used as a motor (drawing power from a bank of batteries) to aid the engine in turning the drive shaft. When the full energy output of the engine is not required for moving the vehicle, the dynamotor (drawing power from the drive shaft) is used as a generator to recharge the batteries. Because the dynamotor and engine shafts are coupled by a fixed mechanical ratio mechanism (a set of gears or even a direct shaft coupling), the usual parallel hybrid transmission complexities are avoided. (A clutch and gear mechanism may be provided between the common dynamotor/engine shaft and the drive for the wheels, but the ratio of the speeds of the dynamotor and engine shafts does not change.) Although during periods of peak acceleration the carburetor throttle may be opened wide, during normal driving conditions the throttle setting remains fixed. In this manner the engine can be adjusted for maximum performance (low fuel consumption and low emission levels).

It is a general object of our invention to provide a parallel hybrid in which the shafts of a dynamotor and combustion engine are coupled together by a fixed gear ratio (which ratio may be unity in the case of direct coupling) but which exhibits marked improvements in both emission levels and fuel economy without any need for complex electronic or mechanical controls.

Briefly, in accordance with the principles of the invention, the throttle of the carburetor is not held fixed. Instead, it is continuously adjusted so that the exhaust rate from the engine is made proportional to the engine shaft speed. The shaft is used to drive a secondary air pump for pumping secondary air into the thermal reactor. Since the exhaust rate is controlled to be proportional to shaft speed, and the rate at which secondary air is pumped into the thermal reactor is proportional to shaft speed, the ratio of engine exhaust to secondary air within the thermal reactor is mantained substantially constant. Even during periods of acceleration and deceleration, the engine exhaust rate is controlled to be proportional to shaft speed. Thus at all times the thermal reactor is maximally effective to reduce the emission levels because the necessary control condition (narrow range of ratios of exhaust flow to secondary air flow) is satisifed.

In the illustrative embodiment of the invention, the engine exhaust rate is made proportional to shaft speed by continuously adjusting the throttle so that the manifold vacuum remains substantially constant. The manifold vacuum is continuously monitored and any change results in a change in throttle setting which returns the manifold vacuum to the desired value. To control acceleration, for example, the accelerator pedal is depressed; this decreases the field current of the dynamotor. A greater armature current thus flows from the battery, and the common engine/dynamotor drive shaft speeds up. With the drive shaft turning faster, there is a tendency for the manifold vacuum to increase (that is, for the manifold pressure to decrease). The feedback causes the throttle to open so that a greater amount of fuel-air mixture is delivered to the engine. This, in turn, causes the exhaust rate to increase. As long as the manifold vacuum is held constant in this manner, the ratio of exhaust volume to shaft speed (secondary air volume) is held constant and all pollutants in the engine exhaust are completely burned in the thermal reactor.

Furthermore, as will be described in detail below, during periods of acceleration, as the manifold-vacuum-controlled-feedback causes the engine to deliver more power by increasing the fuel-air mixture delivered to the engine as just described, the dynamotor automatically functions to draw less and less current from the battery and even to recharge the battery. The proper operation of the dynamotor, during periods of both acceleration and deceleration, is automatic; the dynamotor automatically switches between generator and motor modes of operation without any control circuits actually being provided for that purpose. Equally significant is the fact that during periods of deceleration, not only does the control of the manifold vacuum cause the throttle to close so that less fuel is consumed, but the kinetic energy of the vehicle, as represented in the rotating drive shaft, is automatically utilized by the dynamotor to recharge the battery (a concept known as "regenerative braking").

It is noted that the engine of our invention is not operated at a constant speed and load. There is therefore a slight sacrifice in fuel economy as compared with constant-speed-and-load parallel hybrids. Nevertheless, at the same time that emissions are almost totally eliminated, there is still a substantial improvement in fuel economy over conventional combustion engines, with the added advantage of simplicity of control.

The system described briefly above works best when the carburetor fuel/air ratio is maintained constant as the shaft speed varies. (The carburetor fuel/air ratio is to be distinguished from the engine exhaust/secondary air ratio.) In actual practice, it may be difficult to adjust the carburetor so that the fuel/air ratio does not vary with the throttle opening. If the ratio does vary, it can give rise to imperfect thermal reactor performance. For this reason, we provide a second control technique; the temperature of the exhaust of the thermal reactor is measured and used to control the setting of the carburetor choke. The choke setting determines the fuel/air ratio and it is continuously varied so that the reactor temperature is allowed to vary over only a very small range. This ensures proper reactor performance. Here, too, the control is exceedingly simple — a very important advantage which will be appreciated by those who have tried to reduce emissions by maintaining fine-tuning of many different inter-relating subsystems. in a vehicle.

Further objects, features and adavantages of the invention will become apparent upon consideration of the following detailed description in conjunction with the drawings, in which:

FIGS. 1 and 2, with FIG. 1 being placed on top of FIG. 2, depict an illustrative embodiment of the invention (with the state-of-the-battery control feature omitted for the sake of clarity);

Figure 1:
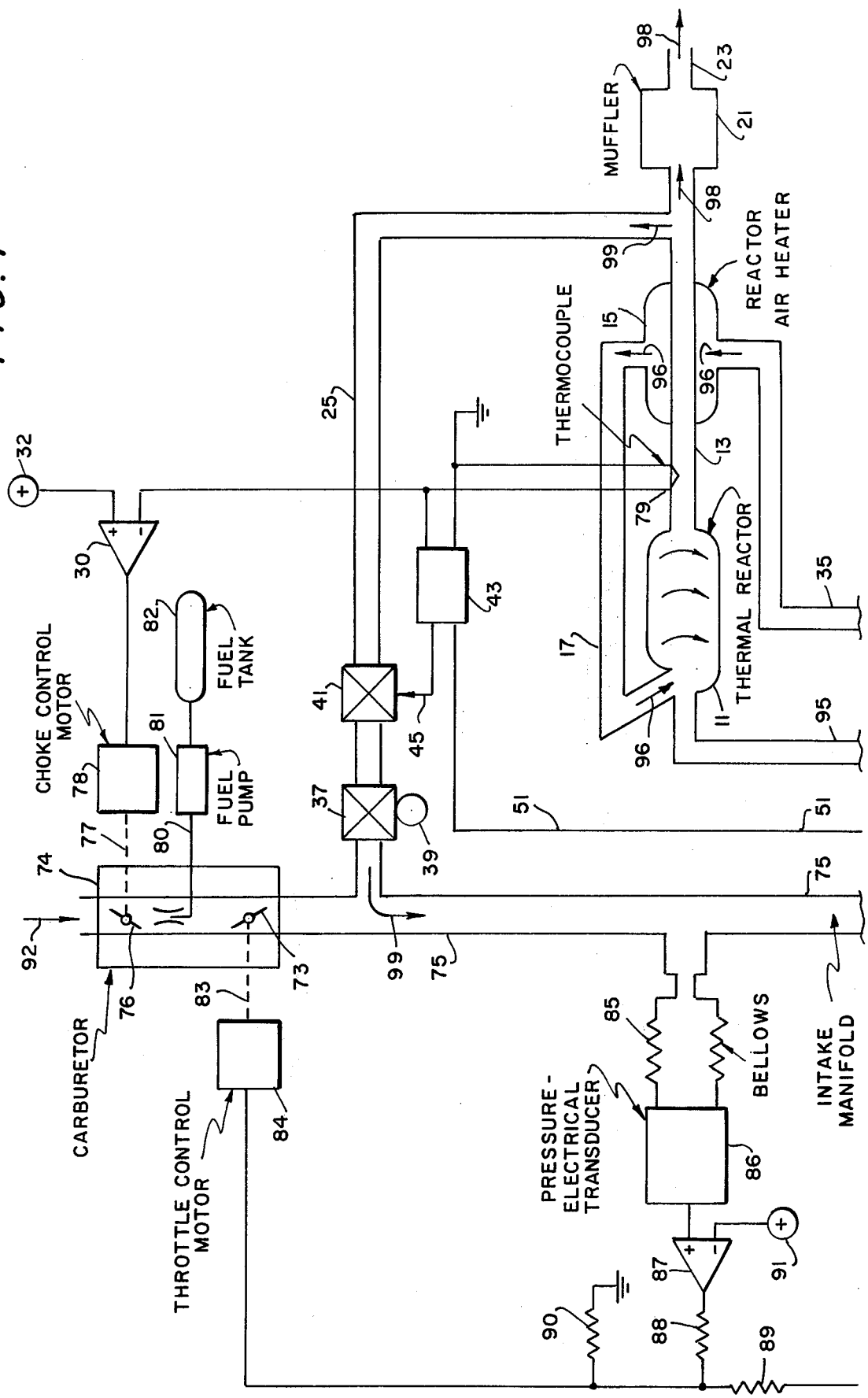
Figure 2:
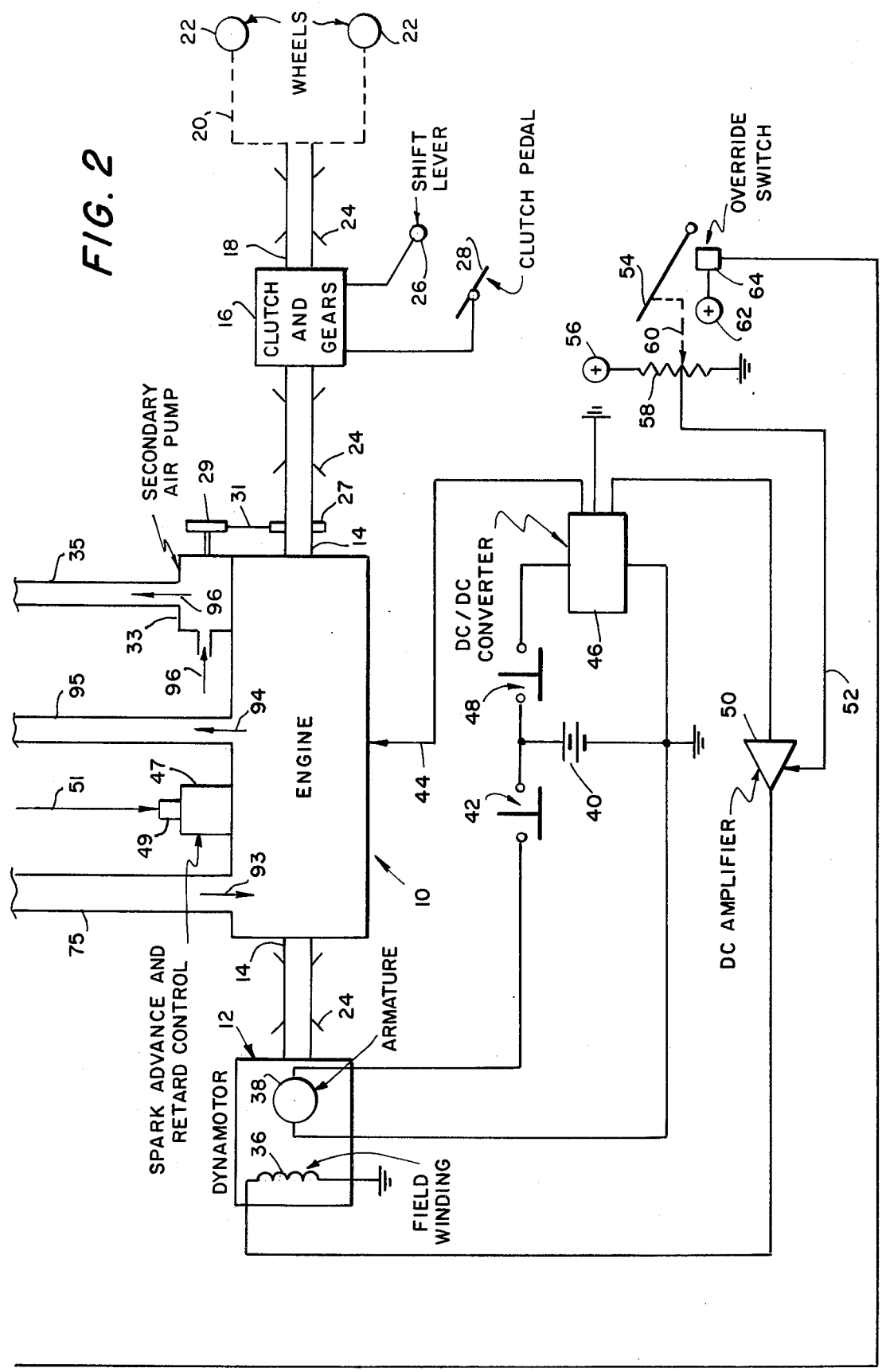

Referring to FIGS. 1 and 2, the "prime mover" of the vehicle is engine 10. The engine shaft 14, supported by bearings 24, is coupled directly to dynamotor 12 and to conventional clutch and gears 16. By use of a conventional shift lever 26 and clutch pedal 28, the clutch and gears control the coupling of shaft 14 to shaft 18. This latter shaft is coupled to wheels 22 (via a differential, not shown), as depicted symbolically by dashed lines 20. The engine, clutch and gears, and for that matter all of the individual elements in FIGS. 1 and 2, are standard elements, our invention pertains to the novel way in which they are interconnected and controlled.

The dynamotor 12 is a DC machine which can be used as a motor or a generator. Its two key elements are field winding 36 and armature 38. When switch 42 is closed, battery 40 is connected across the armature winding. Whether the dynamator operates as a motor or a generator depends upon the current through the field winding and the rotation of the armature as controlled by shaft 14. To accelerate the vehicle, the dynamotor is used as a motor, drawing current from the battery. To recharge the battery, including automatic recharge during regenerative braking, the dynamotor is used as a generator to furnish current to the battery.

In the illustrative embodiment of the invention, the dynamotor and engine shafts are one and the same. But in accordance with the principles of the invention, if the dynamotor and engine shafts are to operate at different speeds, a mechanical ratio other than 1:1 can be employed. But whatever ratio is selected, it remains fixed; that is the reason why the prior art complexities are avoided (as is the case in the above-identified Rosen system).

Battery 40 is also connected via switch 48 to DC/DC converter 46. The converter operates to derive a source of potential on conductor 44 for operating the ignition system of the engine, the control circuits, and the entire electrical system of the vehicle. (Although not shown in the drawing, it is to be understood that the potential on conductor 44 extended to engine 10 is utilized in the usual way for ignition purposes.) Two switches 42 and 48 are provided. When the vehicle ignition switch (not shown) is in the ignition position, both of switches 42 and 48 are closed. When the ignition switch is in the "accessory" position, that is, when the engine is not to operate, only switch 48 is closed.

The other output from DC/DC converter 46 is extended to the input of DC amplifier 50. This amplifier functions to control the current through field winding 36 of the dynamotor in accordance with a control signal on conductor 52. This conductor is connected to the variable tap on potentiometer 58. (Source 56 for this potentiometer can also be derived from DC/DC converter 46.) As accelerator pedal 53 is moved up and down, a mechanical connection shown symbolically by numeral 60 controls movement of the tap on potentiometer 58. Thus the accelerator pedal directly controls the magnitude of the field current of the dynamotor. When the vehicle is to be accelerated, the accelerator pedal is depressed and the field current is reduced. When the vehicle is to be slowed down, the accelerator pedal is allowed to rise and the field current increases. (The purpose of the override switch 64 will be described below.)

In the illustrative embodiment of the invention, battery 40 has a magnitude of 75 volts and the dynamotor is model No. D254AK sold by The H. K. Porter Company. This unit is actually a "separately over-excited interpoles-compensated shunt motor." It is over-excited in that it operates over a wide range of field current, and it is compensated in that additional pole windings compensate for the armature inductance during commutation.

It should be noted that although in the illustrative embodiment of the invention a "standard transmission" with manually operated clutch and gears is employed, the invention is equally applicable to vehicles equipped with an "automatic transmission", and to other transmission systems (e.g., electrical shift) as well. It is the fixed coupling of the dynamotor and the engine shafts in the transmission system which is of importance to the invention and not the variable coupling between the common dynamotor/engine shaft and the wheels.

Carburetor 74 can be a conventional carburetor; air is drawn into it as depicted by arrow 92 and fuel is drawn from line 80 to be mixed with the air. The fuel is supplied from fuel tank 82 by a conventional fuel pump 81. The fuel/air mixture is sucked into intake manifold 75, and from the intake manifold into the engine as shown by arrow 93. The carburetor is provided with the usual choke plate 76 and the usual throttle plate 73. As will be described in detail below, choke control motor 78, via a mechanical connection shown only symbolically by numeral 77, controls the position of choke 76. As is well known, the position of the choke determines the ratio of the fuel to air in the fuel/air mixture drawn through the intake manifold. Throttle control motor 84, via a mechanical connection shown only symbolically by numeral 83, controls the position of throttle 73. The position of the throttle determines the total quantity of the fuel/air mixture which is drawn into the intake manifold.

The feedback for controlling a constant manifold vacuum consists of bellows 85, pressure-electrical transducer 86, and comparator 87 which develops a control signal which is extended to throttle control motor 84.

The pressure in the bellows is that in the intake manifold, and transducer 86 simply develops an electrical signal which is proportional to the pressure in the intake manifold. (The pressure in the intake manifold is usually described in terms of "manifold vacuum", the manifold vacuum increasing as the pressure decreases.) Potential source 91 is connected to one input of difference amplifier 87 and the output of transducer 86 is connected to the other input. As the manifold vacuum tends to vary, the output of amplifier 87 changes. Resistors 88, 89 and 90 comprise a summing network, one input to which is the output of amplifier 87 and the other input to which is derived from override switch 64, as will be described below. Considering for the moment just the output of amplifier 87, it is extended to the input of throttle control motor 84 and controls the operation of the motor to change the throttle setting. The net effect of the feedback is to change the throttle position, in response to any tendency of the manifold vacuum to change, in a direction which returns the manifold vacuum to the desired value. (As the manifold vacuum increases, the throttle opens, and vice versa.)

The engine exhaust, as depicted by arrow 94, is directed through pipe 95 to thermal reactor 11. Preferably, pipe 95 is very short so that the thermal reactor is adjacent to the engine; in this manner when the exhaust gases enter the thermal reactor they are at as high a temperature as possible. As will be described in more detail below, secondary air pump 33 draws in air and pumps it through pipe 35 to the thermal reactor, the air flow being shown by arrows 96. A first pulley 27 is mounted on shaft 14 and a second pulley 29 is mounted on the drive shaft of the secondary air pump 33. A belt 31 is coupled to the two pulleys. The important point here is that the rate at which secondary air is pumped into the thermal reactor is directly proportional to the engine shaft speed since the secondary air pump is actually driven by the engine shaft. (Instead of pulleys and a belt, the same function can be accomplished by a chain of gears. But the use of a pulley is illustrated inasmuch as similar pulleys on the engine shaft are usually used to drive such things as a water pump, power brakes, etc.)

As will be described in detail below, by maintaining a constant manifold vacuum, not only is the ratio of engine exhaust to secondary air held constant so that the thermal reactor can function properly at all times, but the dynamotor automatically shifts between generator and motor modes of operation as required — even though the field current (i.e., position of accelerator pedal) may not change. A change in the field current, as controlled by the accelerator pedal, does cause the dynamotor to accelerate or decelerate dynamotor/engine shaft 14. But then the engine, due to the manifold vacuum feedback, automatically delivers either more or less power without any direct control of the throttle being required. The throttle in the illustrative embodiment of the invention is controlled solely by a self-contained feedback loop.

The air which is drawn into the secondary air pump is taken from under the hood of the vehicle. The fact that the air is warm is desirable. In fact, the secondary air may be heated prior to being pumped into the thermal reactor. The secondary air in conduit 35 is pumped into reactor air heater 15. The exhaust from thermal reactor 11 is extended through conduit 13 which passes through the reactor air heater so that the input air to the thermal reactor is heated before it is used for burning the engine exhaust. After the air is heated in air heater 15, it is extended via conduit 17 to the thermal reactor. It is to be understood that conduit 95 and conduit 17 should be short, the thermal reactor being placed as close to the engine exhaust as possible. The reason for this is that for the best possible burning of the engine exhaust gases in the thermal reactor, the exhaust gases should be as hot as possible. Similarly, the secondary air should be as high in temperature as possible when it is introduced into the thermal reactor. The thermal reactor itself is in essence an insulated portion of the exhaust manifold which acts as a very small furnace. It is available as an integral part of some internal combustion engines, such as the Mazda type RX-2 rotary engine.

Inside thermal reactor 11, the secondary air is mixed with the engine exhaust which contains, in general, burned gases together with unburned HC (hydrocarbons) and CO. It is the HC and CO which must be burned to harmless water and carbon dioxide. Under the proper operating conditions, the unburned gases can be burned completely in the thermal reactor.

For a thermal reactor to operate properly three things are necessary: (1) there must be a proper amount of oxygen and unburned exhaust gases, (2) the burning inside the reactor must take place at a high enough temperature, (3) the reactor must be designed such that enough oxygen mixes well with the unburned exhaust gases, and (4) sufficient time must be allowed for the burning. Conventional thermal reactors are designed to satisfy the last two criteria with little difficulty. But in the prior art it has been difficult to satisfy the other two conditions over the wide range of operating parameters of a conventional vehicle. It the temperature of the thermal reactor is too low, the unburned hydrocarbons and the carbon monoxide in the exhaust will not burn thoroughly in the reactor, and partially burned products will continue through the exhaust system into the atmosphere. Too low a temperature usually results form too lean an air/fuel mixture (that is, too little fuel). On the other hand, with too rich a mixture being delivered to the engine, there will be too much HC and CO to be burned by the secondary air in the reactor and here also the emission level will be high.

If for a typical engine a plot is made of the total emission level versus the ratio of secondary air to engine exhaust, for any given shaft speed the emission level shows a sharp dip over a vary narrow range of secondary air/engine exhaust ratio. The narrow range of minimum emission level is approximately the same for any given shaft speed, although the minimum level itself is a function of speed. It is to insure that the emission level is at a minimum that, in accordance with our invention, the fuel/air mixture furnished to the engine is controlled such that the exhaust rate to the engine is proportional to the engine shaft speed; by driving the secondary air pump by the engine shaft, the secondary air/engine exhaust ratio is maintained approximately constant.

If for some reason there is too high a level or too low a level of unburned gases in the engine exhaust, however, then as described above they will not be completely burned. To insure that complete burning takes place in the thermal reactor, we provide a second type of feedback in addition to the first. Thermocouple 79 in conduit 13, at the output port of thermal reactor 11, is used to measure the temperature of the reactor exhaust. One lead of the thermocouple is grounded and the other is extended to the minus input of high-gain difference amplifier 30. Potential source 32 is connected to the plus input of the amplifier, and the amplifier output is extended to choke control motor 78 which determines the setting of choke plate 76. As the temperature rises, indicating the presence of too rich a mixture, the output of amplifier 30 decreases and the choke plate is closed to lean out the fuel/air mixture. With a leaner mixture, the temperature of the thermal reactor decreases. On the other hand, if the temperature of the reactor exhaust falls too low, indicating an insufficient quantity of combustibles in the engine exhaust, the output of amplifier 30 increases and the choke plate is closed so that a richer fuel/air mixture is delivered to the engine. Thus by measuring the temperature of the burning gases in the thermal reactor, the choke is automatically controlled by a second independent feedback loop to insure the proper operation of the thermal reactor. In general, we have found that a conventional thermal reactor operates best when the burning temperature is held in the range 1,500° − 1,800° F. For this reason, the feedback loop is adjusted to control a burning temperature of approximately 1650° F.

The reactor exhaust in conduit 13, after being used to pre-heat the secondary air which flows through conduits 35 and 17, is passed through muffler 21 and tailpipe 23 as indicated by arrow 98. Some of the exhaust is recirculated as will be described below.

The pre-heating of the secondary air improves the fuel economy. The temperature of the thermal reactor must be high enough to ensure complete burning of the HC and CO in the engine exhaust. By pre-heating the secondary air, the engine can be operated with a leaner fuel/air ratio; the smaller percentage of combustibles in the engine exhaust means that there is less "waste" or fuel.

The thermal reactor reduces the HC and CO pollutants to low levels. It is also desirable, however, to reduce the nitrogen oxides in the engine exhaust. In the prior art, a technique known as exhaust gas recirculation (EGR) has been used to reduce the level of the nitrogen oxides in the vehicle exhaust. A portion of the engine exhaust gases is fed back to the engine input.

This has been accomplished by providing a conduit between the exhaust system (at a point in front of the muffler) and the intake of the engine. The burned gases in the exhaust, when mixed with a fresh charge of air and fuel, produce a lower temperature of burning in the engine because of the dilution of the oxygen with non-combustible exhaust gases. It is known that the peak temperature during combustion is one of the major factor determining the amount of nitrogen oxides in the exhaust and by lowering the combustion temperature, the level of the nitrogen oxide pollutants can be lowered. (The engine combustion temperature is to be distinguished from the thermal reactor temperature. The lower the former, the less the nitrogen oxides in the engine exhaust and therefore in the vehicle exhaust. The higher the latter the more complete the burning of the HC and CO pollutants in the engine exhaust before they are emitted from the tailpipe.)

Referring to the drawing, conduit 25 is connected between a point after reactor air heater 15 and intake manifold 75, with the exhaust gas flow being depicted by arrows 99. It should be noted that the "hesitation" problem usually associated with EGR does not exist in our system. If for any reason the engine fails to provide all of the power necessary during start-up or acceleration, the dynamotor does that automatically since the purpose of the dynamotor is to provide extra power whenever it is needed.

Two valves 37 and 41 are shown in conduit 25. Valve 37 may be provided, as shown, with a throttle control 39 to manually set the EGR flow rate. But in actual practice, it is preferable to delay the start of exhaust gas recirculation until after the engine has "warmed up". Despite the fact that there is no hesitation because the dynamotor furnishes whatever additional power is necessary, until the engine is operating properly the fuel is not fully burned and the HC and CO emissions are relatively high. Thus it is desirable to delay the start of exhaust gas recirculation until after full combustion is taking place in the engine, and the reactor walls are heated up. For this reason, an on/off valve 41 is provided in conduit 35. The element shown by the numeral 43 is simply a voltage comparator which measures the potential developed by thermocouple 79, compares it to pre-set values, and applies energizing signals to conductors 45 and 51 depending on the thermocouple potential. A signal is applied on conductor 45 to open valve 41 when the potential of the thermocouple represents a temperature of 1,500° F. It is only after the thermal reactor temperature has risen to this value (representing that the engine is running "normally") that exhaust recirculation is allowed to begin. It is also possible to provide a timer for this purpose. For example, after engine start-up, 100 seconds may have to elapse before valve 41 is allowed to open. The valve may be any solenoid-operated valve which opens when the requisite control signal appears on conductor 45.

A conventional internal combustion engine is equipped with a spark advance and retard control mechanism depicted by the numeral 47 in the drawing. It is well known that as the engine speeds up the "spark" (engine firing in each cycle) should be advanced, and that the spark should be retarded when the engine is operating at low speeds. The conventional spark advance and retard control contains a mechanism whose position changes in accordance with the shaft speed, and whose position determines the time during each piston cycle when the fuel/air mixture in a cylinder is ignited. The same type of spark timing is desired for the engine used in our system. However, there are some qualifying factors in this regard.

The temperature of the burning gases in the thermal reactor should rise as fast as possible following engine start-up in order that the HC and CO in the engine exhaust will be almost completely burned. The temperature in the thermal reactor will rise faster if combustion in the engine is not complete, that is, if there is a greater amount of still burning fuel in the engine exhaust which can be further burned in the thermal reactor. Incomplete combustion in the engine can be controlled by retarding the spark from its normal setting immediately after start-up. By locking mechanism 47 in place during engine warm-up, spark advance is inhibited and the reactor temperature can be brought to the 1,650° F level more quickly.

But there also may be a problem in locking control mechanism 47 in place immediately upon start-up. The engine cranking speed is very high because the engine shaft is driven by the dynamotor. (The conventional starter is not necessary because that function is taken over by the dynamotor.) Without the normal advance of sparking, as controlled by mechanism 47, immediately upon start-up the engine may not fire. For this reason, when the engine is first started and the "cranking" speed of the shaft is high, mechanism 47 should be allowed to advance in its usual manner. Immediately after the engine has fired, mechanism 47 should return to its starting position and lock in place so that there will be incomplete combustion in the engine. Only after the thermal reactor has reached a high operating temperature should mechanism 47 be unlocked again so that it can operate normally.

This sequence of operations is controlled by solenoid 49 and control conductor 51 which is energized by voltage comparator 43. At engine start-up, the reactor temperature is at its lowest. Voltage comparator 43 leaves conductor 51 de-energized so that solenoid 49 does not operate. With the solenoid unoperated, mechanism 47 operates in its normal manner, allowing spark advance. Immediately after the engine has fired, the thermal reactor temperature rises. As soon as the temperature reaches 300° F. voltage comparator 43 energizes conductor 51 and solenoid 49 operates. The solenoid simply returns mechanism 47 to its normal position; the solenoid shaft bears against mechanism 47 and forces it to return to its normal position. (Although not shown in the drawing, such a mechanical arrangement will be readily apparrant to those skilled in the art.) With a retarded spark, there is incomplete combustion in the engine and the combustion is completed in the reactor. Therefore, the thermal reactor temperature rises much faster. As soon as the temperature reaches 1,500° F, a point at which almost all of the HC and CO pollutants are being burned in the thermal reactor, voltage comparator 43 de-energizes conductor 51 once again and solenoid 49 releases. Mechanism 47 can now change position in the usual way so that the engine firing can be advanced as it should be at high engine speeds to control proper engine combustion.

Thus far choke control motor 78 has been described as controlling the position of choke plate 76 in accordance with the temperature of the thermal reactor. The feedback is designed to maintain an operating temperature of 1,650° F in the illustrative embodiment of the invention. In a conventional carburetor, the choke is ordinarily closed when the engine is first started so that a large amount of fuel is sucked into the in-rushing air in the carburetor. As the temperature rises as the engine starts to function, the choke is opened so that less fuel is used. Present-day vehicles are equipped with chokes which operate automatically in this manner. Choke control motor 78 functions to close the choke at low thermal reactor temperatures so that the quantity of fuel emitted into the carburetor increases. Thus when the engine is first started, the choke control motor closes the choke just as the automatic choke control in the carburetor itself would close the choke. It is only at higher temperatures, after the conventional automatic control of the choke would normally maintain the choke in the fully opened position, the choke control motor 78 is required to control the choke position so that the thermal reactor temperature is maintained at the desired value. Rather than to allow the choke plate to be controlled both by the conventional automatic choke control and by choke control motor 78, it is preferable to disable the automatic choke control of the carburetor and to have the entire control function assumed by the choke control motor. Otherwise, at higher temperature, motor 78 may have to turn the choke plate in a direction against that in which it is turned by the automatic choke control.

Although the manifold vacuum feedback controls throttle 73 so that the manifold vacuum is maintained approximately constant, there are emergency conditions when it is desirable to open the throttle as wide as possible for maximum power. Accordingly, there is provided an override switch 64 which is actuated when accelerator pedal 54 is depressed beyond a pre-set position. When the override switch is closed, potential source 62 is extended through resistor 89 to the summing junction of resistors 88 and 89. The increased potential at the input of throttle control motor 84 causes the throttle to be opened as wide as possible independent of the position called for by the manifold vacuum feedback loop.

The exact characteristics of the manifold vacuum feedback loop are not critical to the practice of the invention. Thus is is not necessary, for example, for the throttle position to change "instantaneously" in response to a change in manifold vacuum. Some lag in the response is, of course, to be expected. In general, we have found it preferable to employ a feedback loop in which for a (theoretical) step change in manifold vacuum, the throttle position changes as fast as possible to the new required position without there being any more than a 5% overshoot in the throttle position. The overshoot and damping of the feedback loop is determined primarily by the characteristics of throttle control motor 84 but can be modified by inserting appropriate lead/lag circuits in the feedback loop; however, there is nothing critical about the response of the feedback loop although, of course, the faster the response (without any excessive overshoot), the better. (Similar remarks apply to the choke control feedback loop.)

As will become apparent below, when the engine is idling and the clutch is first engaged, the engine shaft speed necessarily drops. With a decrease in shaft speed the manifold vacuum decreases and the feedback loop causes the throttle to close slightly. We have found that at this time the control conditions in the thermal reactor may be out of balance for proper emissions control. The characteristics of a conventional carburetor are such that the fuel/air ratio drops when the clutch of the vehicle is first engaged, and the ratio may become too small for maximum effectiveness of emissions control. For this reason, and if emissions control is of primary concern, the carburetor may be adjusted such that the throttle is not allowed to close past the "idling" position. That is, the maximum closing of the throttle should occur when the engine is idling before the clutch is engaged. This can be controlled simply by providing a stop past which the throttle plate cannot move. The exact position of the stop, of course, depends on the particular engine and carburetor which are employed, but any system constructed in accordance with the principles of our invention is easily "tuned" for proper performance. If the carburetor which is employed provides a fuel/air mixture which is not too lean when the throttle is closed past the "idling" position, there is no reason to limit its movement. The problem does not exist when an automatic transmission is employed because in such a case the minimum shaft speed is the idling speed.

It should also be noted that while the choke plate position is used to control the fuel/air ratio, this ratio, in some carburetors, may also be determined to a lesser extent by the throttle plate position and the engine speed. But the primary control of the ratio is determined by the choke position and the thermocouple feedback loop controls the choke because it is the choke that to the greatest extent determines the fuel/air ratio, that is, the temperature of the gases inside the thermal reactor. Of course, instead of using the choke to control the fuel/air ratio, it is possible to use a variable venturi or some other mechanism for controlling the fuel/air ratio. Similarly, rather than to vary the position of the throttle in accordance with the manifold vacuum, the throttle setting could be controlled by the engine shaft speed directly. In such a case there would be no feedback, but simply a direct control of the throttle by the shaft speed. The primary goal is to obtain a rate of engine exhaust which is directly proportional to shaft speed so that the secondary air pump can be driven directly by the shaft. By maintaining a constant manifold vacuum, the exhaust per engine stroke is constant and this, in turn, establishes that the total exhaust rate is proportional to the engine shaft speed as desired. (To a first degree, the intake and therefore the exhaust per stroke is proportional to manifold vacuum only.) But a constant manifold vacuum could also be maintained by driving the throttle directly in accordance with the shaft speed. The greater the shaft speed, the greater the manifold vacuum under ordinary circumstances, so that opening the throttle as the shaft speed increases would tend to prevent an increase in the manifold vacuum. If a cylinder fuel injection system is employed, there is no manifold vacuum to control because there is no intake manifold in the first place. In such a case, the fuel injection system should be controlled directly so that the exhaust rate of the engine (measured in volume per second) is always proportional to engine shaft speed. This is controlling criterion in accordance with the principles of the invention — whether a fuel injection system is employed, or whether a carburetor is employed and the throttle opening is determined either by a manifold vacuum feedback loop or directly in accordance with the engine shaft speed.

The counter-electromotive force generated across the armature winding is equal to a constant (determined by the dynamotor design) multiplied by the field flux density and the angular velocity of the shaft. The voltage of the battery connected across the armature winding is equal to the counter-electromotive force plus the resistive voltage drop across the armature winding (the resistive voltage drops being equal to the product of the armature winding resistance and the armature current). This can be expressed by the equation $I_a = (E_b - k\phi w)/R$, in which $I_a$ is the armature current, $E_b$ is the voltage of the battery connected across the armature winding, $k$ is a constant determined by the motor design, $\phi$ is the field flux density, $w$ is the angular velocity of the armature, and R is the resistance of the armature winding. At light load, the counter-electromotive force $(k\phi w)$ is approximately equal to $E_b$, and the armature current is very low. If the counter-electromotive force is decreased by decreasing $\phi$ or $w$, even by a small amount, the armature current will increase significantly. This controls a significant increase in the generated torque since the torque is proportional to the product of the field flux density and the armature current. As the torque increases, $w$ decreases. Thus if the original change in armature current results from a change in speed, the resulting change in armature current is in a direction which causes a change in speed in the opposite direction. It is for this reason that the dynamotor tends to be quasiconstant speed device. The equation for the armature current also shows that if the dynamotor is driven by the engine so that the counter-electromotive force (which is partially determined by shaft speed) is greater than the battery voltage, then the armature current is negative, that is, the dynamotor functions as a generator to recharge the battery.

Before proceeding with a more detailed qualitative analysis of the system operation, it is important to understand why the quasi-constant speed feature of the dynamotor is desirable. With a constant engine exhaust/secondary air ratio (the desired criterion), it is to be expected that as the engine shaft speed changes, the thermal reactor temperature will vary. Even though the ratio remains constant, it will be understood that the smaller the total rate at which the engine exhaust and secondary air are delivered to the thermal reactor, the lower will be the thermal reactor temperature. Although the temperature may not change appreciably with engine speed, the thermocouple feedback does vary the fuel/air ratio to compensate for even small changes. When the fuel/air ratio changes, the power delivered by the engine necessarily changes as well. This might result in a change of vehicle speed without any operation on the part of the driver, an effect which is to be avoided. But because the dynamotor is a quasi-constant speed device, as long as the accelerator pedal (field current) is maintained at a fixed level, if the engine shaft does tend to change speed for one reason or another (e.g., as the road level changes), the current through the armature simply changes in a direction which resists the change in speed. Any changes which do occur, do so over a relatively long time interval and go unnoticed by the driver who automatically gradually changes the position of the accelerator pedal.

Contacts 42 are heavy-duty contacts so that they can withstand the large current which immediately starts to flow when they are first closed. Similarly, the brushes and commutator bars of the dynamotor must be able to withstand a large inrush of current without damage. Rather than to use heavy-duty components, it is possible to provide a limiting resistor in series with contacts 42; as the armature current builds up gradually to a pre-set level, the resistor may be shorted out by an additional pair of contacts, an SCR, etc. It will be apparent to those skilled in the art that various contact arrangements may be employed for starting the dynamotor operation.

Also, although a single battery (actually comprised in practice of many individual batteries) of 75 volts is used in the illustrative embodiment of the invention, it is possible to use several different banks of batteries which can be arranged in various series-parallel connections depending upon the power required by the vehicle. The battery banks may be in parallel when the vehicle is being driven at slow speeds or when the engine is idling, and they may be connected in series when high acceleration and high speeds are required. Similarly, multiple arrangements of series-parallel connections are possible. In general, the use of multiple battery banks permits a small dynamotor to be employed since high-power operation can be accomplished by connecting battery banks in series. But the electronic controls in such a case may have to be more elaborate, and the simplicity of control in the illustrative embodiment of the invention outweighs whatever disadvantage accompanies the use of a larger dynamotor.

The constant manifold vacuum (or alternative direct throttle or fuel injection control, as described above) maintains the ratio of engine exhaust to engine shaft speed relatively constant so that it is a relatively simple matter to control the proper operation of the thermal reactor. The constant manifold vacuum also insures that while the engine load and speed may vary, changes are more gradual, thus further reducing emission levels. (Admittedly, however, the pollutants in the engine exhaust — and without considering the thermal reactor — are greater than those which would result were the engine operated at a constant speed and load as has been the usual approach in parallel hybrids. In fact, that is why the thermal reactor is required.) The third great advantage of the constant manifold vacuum technique is that it automatically controls the proper operation of the dynamotor during acceleration and deceleration.

Figure 3:
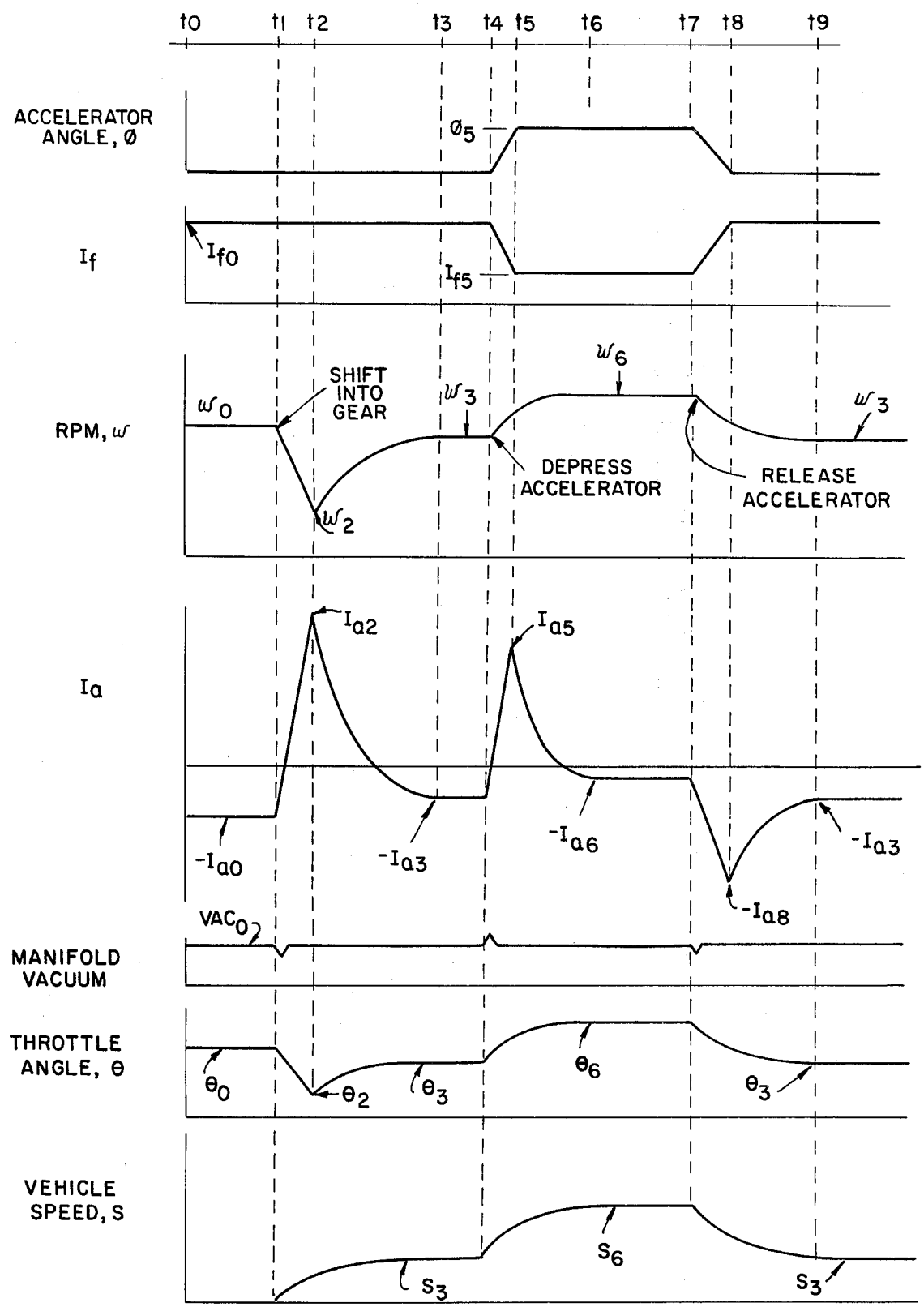
FIG. 3 is a series of plots which depict the operation of the vehicle under typical operating conditions (without reference to the state-of-the-battery control feature)

FIG. 3 depicts what happens in the system when the engine is first idling, the vehicle is then shifted into gear followed by depression of the accelerator pedal, and the accelerator pedal is finally released to slow up the vehicle. The top line in FIG. 3 represents time, with the various values t0 through t9 representing respective times when specific events occur, as will be described below. The other plots, from top to bottom, represent accelerator pedal angle (that is, a command by the driver to speed up or slow down the vehicle), dynamotor field current, dynamotor/engine shaft speed, dynamotor armature current, manifold vacuum, carburetor throttle angle, and vehicle speed.

It is assumed that at some time t0 the vehicle is idling, that is, the engine has been started but the gears are still in the neutral position. This means that the accelerator is in the fully released position (represented by an angle of 0), corresponding to the maximum field current $I_{f0}$ as shown in the plot.

The field current which is selected for idling is such that with the common engine/dynamotor shaft turning at the idling speed $(w_0)$, the dynamotor acts as a generator. Thus in FIG. 3, at time t0 and for the field current $I_{f0}$ which flows when the accelerator pedal is fully released, the armature current which flows in the dynamotor is negative, indicating that the battery is being recharged when the engine is idling. The idling current has a value $-I_{a0}$. The manifold vacuum is at a level $VAC_0$, the throttle, in the idling position, controlling this manifold vacuum which in turn sets the idling shaft speed (and thus the idling armature current). The throttle angle itself, shown in the next-to-last waveform, is $\theta_0$. The vehicle speed, of course, is 0 since the gears are in neutral, as shown in the last plot.

At time t1 it is assumed that the clutch and gears are engaged. (This is indicated by the notation "shift into gear" in the RPM plot.) Since the position of the accelerator pedal is not changed, the filed current remains at the $I_{f0}$ level. But the shaft speed necessarily decreases as the vehicle is shifted into gear. Since the clutch cannot be engaged fully instantaneously, it slips over a short period of time stretching between $t1$ and $t2$, the clutch being fully engaged by time $t2$. At this time, the engine shaft speed has dropped to a value of $w_2$.

Because of the drop in engine shaft speed between times $t1$ and $t2$, the counter-electromotive force generated by the dynamotor decreases (since the counter-electromotive force is proportional to engine shaft speed). The battery voltage is now greater than the counter-electromotive force, and the armature current not only decreases in magnitude but actually changes in direction as well. The armature current changes from a value of $-I_{a0}$ to a value of $+I_{a2}$ during the time that the shaft speed decreases from $w_0$ to $w_2$. The positive armature current is drawn from the battery.

At time $t_1$, when the engine shaft starts to decrease in speed, the manifold vacuum starts to decrease. (For any given throttle position, the pressure in the manifold increases as the engine shaft speed decreases.) As soon as this happens, the throttle starts to close as a result of the feedback so as to return the manifold vacuum to the desired $VAC_0$ level. (As mentioned above, in those cases where the fuel/air mixture becomes too lean if the throttle is closed past the idling position, a stop may be provided to prevent the throttle from closing past the idling position. In the example of FIG. 3, it is assumed that the fuel/air mixture does not become too lean even if the throttle is closed past the idling position so that there is no need to prevent its closing past angle $\theta_0$.) During the time interval that the engine shaft speed drops from $w_0$ to $w_2$, the feedback causes the throttle to move toward the closed position, and the throttle angle changes from $\theta_0$ to $\theta_2$. It will be noted that in the plot for manifold vacuum there is a slight dip immediately following the shifting into gear. This is due to the fact that there is some finite time required for the feedback loop to start to move the throttle. The throttle has to "catch up" to the changing shaft speed before the manifold vacuum returns to its original level. Thus, although the throttle angle changes as the engine shaft speed changes in order to maintain the manifold vacuum at a constant level, there is a relatively short dip in the manifold vacuum until it is restored to the steady-state level. The vehicle speed, of course, starts to increase at time t1 as the wheels are coupled to the engine shaft via the clutch.

If an automatic transmission is employed in the vehicle, there is no such thing as simply putting the vehicle into gear. Instead, with the system idling and the vehicle standing still, the driver brings the vehicle into motion by speeding up the engine; the system operation is that which will be described below as starting at time t4 when the accelerator pedal is depressed. Thus in the case of an automatic transmission, the operation of the system is even easier to understand and because there is almost no drop at all in the manifold vacuum when first moving from a standstill, there may be even better control of emissions.

It should also be understood that it is being assumed in the present discussion that the battery voltage is constant, that is, that the armature current (for a constant field current) is dependent solely upon the shaft speed. Of course, the battery voltage will vary somewhat depending upon the accumulated charge, but variations in battery voltage are at best "second order" effects which do not materially change the present qualitative description of the system operation.

When shifting into gear, the engine speed decreases to its lowest value; a very large current is drawn from the battery and flows through the armature, the dynamotor now acting as a motor. The large armature current generates a large armature torque to aid the turning of the engine shaft. Following the lowest engine speed which is reached at time t2 (by which time the gears are fully engaged), the engine speed starts to increase with the dynamotor still acting as a motor. (It is to be recalled that throughout this operation the accelerator pedal is still not depressed and the field current is at its initial level.) The engine shaft increases until it reaches a speed $w_3$ at time $t3$. As the engine shaft increases in speed between times $t2$ and $t3$ so does the vehicle speed, the vehicle speed reaching a value of $s_3$ at time $t3$. In first gear, with the accelerator pedal still not depressed, the vehilce speed is typically less than 10 miles per hour, representing a very low "road load" on the engine. The engine speed in such a case is only slightly less than the idling speed, and thus speed $w_3$ is shown as being only slightly less than speed $w_0$.

As the engine speeds up between times $t2$ and $t3$, without any change in the throttle position the manifold vacuum would ordinarily increase. To maintain the manifold vacuum constant, the feedback loop causes the throttle angle to increase, that is, it causes the throttle to open. By time $t3$, the throttle angle assumes a position $\theta_3$.

While the shaft speed is increasing (due to the dynamotor) and the throttle is being opened to maintain a constant manifold vacuum, it is apparent that the power delivered by the engine also increases (due to the throttle opening). With more power delivered by the engine, less power is required from the dynamotor. In fact, the engine power by time $t3$ is greater than that required to move the vehicle under the low road load. What happens automatically is that the dyanmotor changes in a continuous manner from motor operation back once again to generator operation. As the shaft speed increases to $w_3$, under which condition (and with the initial field current) the counter-electromotive force is greater than the battery voltage, current starts to flow from the armature to the battery rather than in reverse. Thus the armature current starts to decrease from a level $+I_{a2}$ to a level $-I_{a3}$. The dynamotor thus operates as a generator once again. The magnitude of the current delivered to the battery at time $t3$ is less than the magnitude of the current delivered at time $t_0$ because shaft speed $w_3$ is less than shaft speed $w_0$.

An added advantage of the system of our invention is that even if the vehicle is put into gear rapidly, unlike conventional shift vehicles, the system will not stall. This is because the dynamotor, which generates high torques at low speeds, ensures that the vehicle is brought up to the desired speed without engine stalling.

It is important to note that at time $t1$, when the vehicle is shifted into gear, the shaft speed must necessarily decrease due to mechanical considerations. Increased power to the shaft is desirable at this time to return the shaft speed to its idling level or at least to a level somewhat below it. This is accomplished automatically because as soon as the shaft speed slows down, the dynamotor switches from generator operation to motor operation to provide additional torque for turning the shaft. The engine (shaft) speed and the dynamotor automatically adjust themselves to levels at which the vehicle moves slowly as it should in first gear, even with the accelerator pedal not depressed, and without there being any drain on the battery. (In fact, charging of the battery takes place as represented by the negative $I_{a3}$ current.)

It is the initial decrease in the shaft speed when the vehicle is shifted into gear that causes an increase in the armature current, which in turn causes the shaft speed to increase. As described above, the dynamotor is a quasi-constant speed device which tends to resist changes in shaft speed. It is this aspect of the dynamotor operation that increases the shaft speed after the initial drop.

At some subsequent time $t4$, it is assumed that the driver depresses the accelerator pedal to speed up the vehicle. The accelerator angle is shown as changing from an angle of 0 (fully released) to an angle of $\phi_5$ between times $t4$ and $t5$. Depression of the accelerator pedal results in a decrease in the dynamotor field current. The current decreases from $I_{f0}$ to $I_{f5}$ during the same short interval that the accelerator pedal is moved. The time constant of the dynamotor field current is usually short in comparison with driver motions in the control of a vehicle, so it can be assumed that the $I_{f5}$ level is reached at the same time that the new accelerator pedal position is reached.

The counter-electromotive force in the dynamotor is proportional to the product of shaft speed and field current. Due to the sudden decrease in field current, the counter-electromotive force drops to a value below that of the battery voltage. The armature current thus changes direction between times $t4$ and $t5$ and rises to a new peak value $I_{a5}$ which may or may not be different from $I_{a2}$, depending on the final position of the accelerator pedal. Because the armature current increases in percent much more than the percent decrease in field current, there is an increase in the torque applied to the shaft. (The torque is proportional to the product of the field and armature currents.) The shaft speed thus starts to increase between times $t4$ and $t5$ as shown in the drawing, and so does the vehicle speed.

The moment that the shaft starts to speed up, there will be a slight increase in the manifold vacuum. But the automatic vacuum control soon brings the manifold vacuum back to its original value in a very short period of time. The brief increase in manifold vacuum when the accelerator is depressed is comparable to the brief decrease in manifold vacuum when the vehicle is shifted into gear. As the engine and vehicle speed up, the throttle starts opening so as to maintain the vacuum constant. The opening of the throttle follows the speeding up of the engine.

The large current which flows through the armature continues to apply a high torque to the shaft; the shaft continues to speed up even after the peak armature current $I_{a5}$ is reached. But as the shaft continues to speed up after time $t5$, what happens is similar to what happens as the shaft speeds up following time $t2$. The increased shaft speed causes the counter-electromotive force to continue to increase. After time $t5$, the field current is constant, and the continuing increase in shaft speed now causes the armature current to start to decrease. Although the armature current starts to decrease, the shaft speed still continues to increase since the current is still positive and the dynamotor functions as a motor. Eventually, by time $t6$, the shaft speed assumes a steady-state value of $w_6$ and the armature current assumes a value of $-I_{a6}$, in which case the current flowing into the battery now recharges it. Of course, because the vehicle is now moving at an increased speed ($s_6$) and the dynamotor is once again operating as a generator, it is obvious that increased engine power is required. But this is accomplished automatically; as the shaft continues to increase in speed, in order to keep the manifold vacuum constant the throttle must continue to open. As the throttle continues to open, eventually reaching an angle of $\theta_6$ at time $t6$, more and more fuel is delivered to the engine so that the engine can deliver the extra power required.

The exact value $I_{a6}$ of armature current depends on the position of the accelerator pedal. The armature current may be close to 0 (in which case the counter-electromotive force and the battery voltage are equal). At lower speeds, the armature current is negative, that is, the battery is recharged. But if the field current has been set low enough, that is, the vehicle is to be operated at a very high speed and the accelerator pedal has been depressed quite far (but assuming not far enough to operate the override switch, in which case the throttle is opened fully, separate and apart from the manifold vacuum feedback loop), the current at time $t6$ may be slightly positive. The battery in such a case supplies power to help the engine drive the vehicle at the new speed $s_6$.

It is thus seen that a decrease in the field current, while affecting the dynamotor only, actually results in the throttle opening because of the manifold vacuum feedback; as the shaft speeds up due to the initial decrease in field current, the throttle starts to open to maintain a constant manifold vacuum. This, in turn, causes the engine to deliver more power to the shaft. The large armature current which initially flows when the field current is reduced gradually decreases as the throttle continues to open until eventually a new steady-state condition is achieved. All of this is accomplished automatically simply by maintaining a steady manifold vacuum (or, alternatively, by controlling in some other way the amount of fuel delivered to the engine to be proportional to the engine speed). At the same time that the thermal reactor functions properly even during periods of acceleration because the exhaust rate of the engine is always proportional to the engine shaft speed, the dynamotor automatically supplies extra power to the shaft only when it is needed, and otherwise controls the recharging of the battery.

An added advantage of the system of our invention is that when the accelerator is suddenly depressed at time $t4$, the usual roar associated with an internal combustion in a vehicle during acceleration is absent. This is due to the fact that the accelerating power is at least initially provided by the comparatively quiet dynamotor. It is in a conventional vehicle that the throttle can be fully opened very fast when the accelerator pedal is depressed, resulting in a sudden surge in engine power with the concomitant noise. But because the initial power surge required for acceleration is provided by the dynamotor which is a quiet device, with the throttle then opening only slowly to increase the engine power, the vehicle of our invention is relatively quiet.

Although the above description pertains only to shifting into first gear, followed by depression of the accelerator, it will be understood that similar changes in the various parameters take place when the vehicle is shifted into other gears. The changes which take place are not shown in FIG. 3 because the interaction of the various elements in the system are basically the same as when shifting into first gear. What is next shown in FIG. 3 is what happens when the vehicle is to be slowed down by releasing the accelerator pedal. The vehicle slows down quite rapidly, without dissipating any energy in the brakes (although obviously the vehicle must be equipped with a brake system to control fast stopping). The vehicle slows down rapidly because the braking is "dynamic" in the sense that the kinetic energy of the shaft is automatically converted to electrical energy in the battery when the accelerator pedal is released. This is a very great advantage because it allows rapid slowing down of the vehicle without dissipation of the kinetic energy as heat, and the recovery of some of the energy into the batteries. And once again, this advantage is achieved automatically without the need for any complex controls.

It is assumed that at time $t7$ the accelerator pedal is rapidly relaxed so that it restores to an angle of 0. In the same interval between time $t7$ and $t8$, the field current returns to its maximum value $I_{f0}$.

Because of the high speed of the shaft and the high value of field current, the counter-electromotive force rises substantially above the battery voltage. This causes the armature current (flowing into the battery) to increase from a low level $-I_{a6}$ to a very high level $-I_{a8}$. This high value of current represents significant energy storage in the battery. Although the field current increases, the much greater increase in armature current applies a torque which slows down the shaft. Thus rather than the shaft simply slowing down as the vehicle coasts along, the vehicle is dynamically braked in that the torque applied to the shaft opposes the shaft turning.

The peak current of $-I_{a8}$ is reached at time $t8$. At this time the field current stops increasing. The large armature current continues to slow down the shaft so that the shaft speed continues to decrease, but the armature current now starts to decrease in magnitude since the field current is no longer changing. Eventually, at time $t9$, the armature current returns to the "in gear" steady-state value $-I_{a3}$ and the shaft speed returns to the in gear steady-state speed $w_3$. At the same time, the vehicle speed slows down to the speed $s_3$ which was previously reached at time $t3$.

Between times $t7$ and $t9$, as the shaft speed decreases, the manifold vacuum feedback causes the throttle to close so that there is no decrease in manifold vacuum as there otherwise would be with the slowing up of the engine shaft. This automatic closing of the throttle also reduces the fuel delivered to the engine so that the engine generates the lesser power which is now required as a result of the release of the accelerator pedal. It should also be noted that there is a brief drop in manifold vacuum at time $t7$, just as there is at time $t1$, until the manifold vacuum feedback loop can cause the throttle position to "catch up" to the changing shaft speed.

Not only is the slowing down of the vehicle achieved without the need for complex electronics circuits, but the energy recovered from the shaft and stored in the battery, rather than being dissipated in the brakes, can aid appreciably to fuel savings, especially under urban stop-and-go traffic conditions. Such a fuel savings also reduces the overall pollution, since, in general, the total amount of the pollutants which are emitted depends on the quantity of fuel which is consumed. And even during periods of deceleration, the thermal reactor continues to function as required because the ratio of engine exhaust to shaft speed remains constant.

In the system of FIGS. 1 and 2, the charging and discharging of the battery 40 has been described thus far as being a function only of engine power requirements. With a very large battery, and especially where the battery can be charged (or even discharged) when the vehicle is not in use, there may be little concern for the battery becoming excessively discharged or charged during vehicle use. However, it is desirable to build in protection against the vehicle battery being charged or discharged beyond safe limits.

Figure 4:
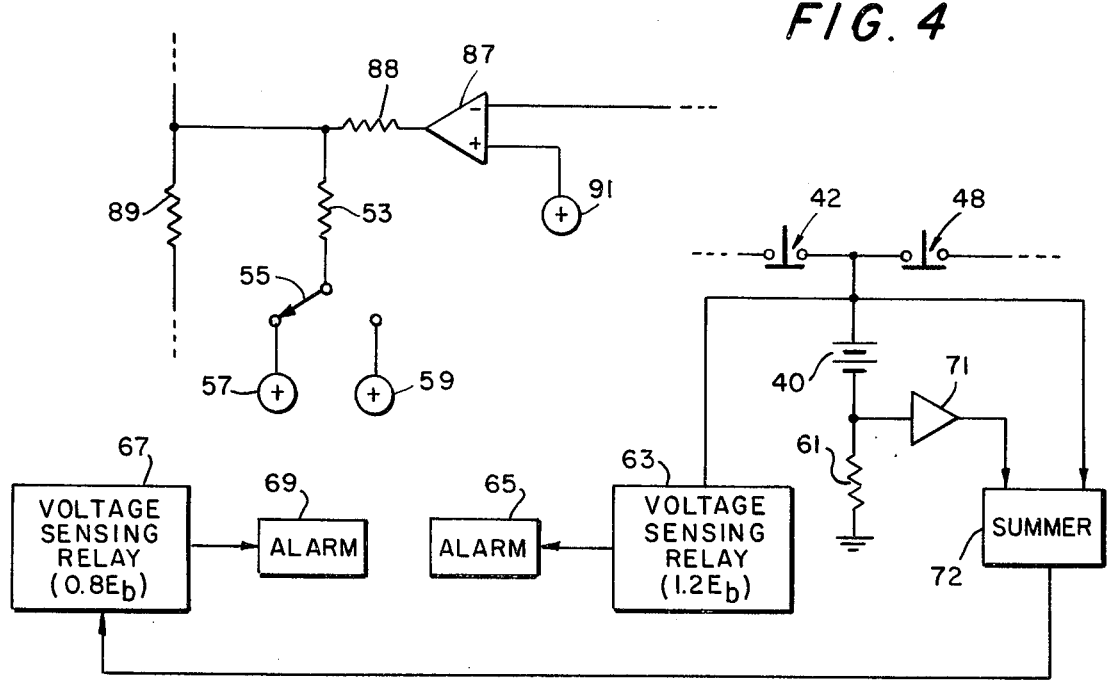
FIG. 4 depicts the state-of-the-battery control circuitry which is added to the system of FIGS. 1 and 2 in the preferred embodiment of the invention.

FIG. 4 depicts the manner in which the system of FIGS. 1 and 2 is modified for controlling the charging and discharging of the battery in accordance with the state of the charge of the battery. It will be recalled that in the system of FIG. 1, resistors 88 and 89 are parts of a summing network in the throttle control feedback loop. In the circuit of FIG. 4, a third resistor 53 is added to the summing network, with switch 55 connecting resistor 53 to either potential source 57 or potential source 59. For reasons to be described below, source 57 has a magnitude greater than that of source 59. In series with battery 40 there is now provided an additional resistor 61. The potential developed across this resistor is extended to the input of inverting amplifier 71. The positive terminal of battery 40 is extended to the input of summer 72 and to the input of voltage sensing relay 63. As will be described shortly, when the charging of the battery is excessive, voltage sensing relay 63 operates to energize alarm 65. The alarm informs the driver that switch 55 should be placed in the position which connects source 59 to the summing network. Switch 55 may be a two-position switch with each of alarms 65 and 69 including an indicator light at a respective end of the switch. The particular light which is illuminated informs the driver of the new position required for the switch. Alarm 69 is operated whenever the battery has been discharged to the lower limit, at which time switch 55 is moved to the position shown. As will become apparent below, shortly after either corrective action is taken, the condition which triggered the respective alarm in the first place will be corrected; whichever voltage sensing relay previously operated is soon released, and the alarm signal will be cancelled.

Before proceeding with an explanation of the operation of the circuit of FIG. 4, it will be helpful to consider the operation of the throttle control feedback loop itself in greater detail. Referring to FIGS. 1 and 2, when accelerator pedal 54 is depressed all the way down, override switch 64 is operated and potential source 62 is extended to resistor 89 in the summing network. Thus the voltage at the junction of resistors 88 and 89 jumps to a large positive value and throttle control motor 84 causes the throttle to open wide. This, in turn, causes the engine to deliver the extra burst of power required by the driver. But during normal driving conditions, override switch 64 is open. It is thus the potential at the output of high-gain difference amplifier 87 which controls the throttle setting. In one system which was operated, the manifold vacuum could be varied between 0 inch and 27 inches, and a "constant" manifold vacuum of 13 inches was selected. (This was for a 4,000 pound vehicle equipped with a Mazda RX-2 rotary engine.) For a 13 inch manifold vacuum, the output of pressure-electrical transducer 86, applied to the minus input of difference amplifier 87, is such that the potential at the output of the amplifier causes throttle control motor 84 to open the throttle to the extent required to produce a 13 inch manifold vacuum when the engine is first started and the system is not in gear, that is, the throttle angle is $\theta_0$ as shown in FIG. 3.

If the manifold vacuum now tends to decrease, for example, when the system is first shifted into gear, corresponding to an increase in manifold pressure, the output of pressure-electrical transducer 86 increases. Since the output of the tranducer is connected to the minus input of amplifier 87, the output of amplifier 87 decreases. This, in turn, results in the closing of the throttle which compensates for the tendency of the manifold vacuum to decrease. Similarly, any tendency of the manifold vacuum to increase, for example, when the accelerator is depressed, results in the opening of the throttle. It will be apparent to those skilled in the art of feedback systems that numerous other feedback techniques can be employed to maintain the manifold vacuum at the desired 13 inch level.

It should be noted that it is the initial potential at the output of amplifier 87 which determines the manifold vacuum which is maintained. This level can be adjusted by selecting an appropriate magnitude potential source 91 connected to the plus input of difference amplifier 87. In the system of FIG. 4, a third summing resistor 53 is utilized so that an additional incremental voltage, determined by the magnitude of source 57 or source 59, appears at the summing junction of resistors 88, 89 and 53. Potential source 91 in the system of FIG. 4 has a magnitude which is less than that of the same source in FIG. 1 because of the additional increment of voltage furnished by one of the two new sources.

Since source 57 has a magnitude greater than that of source 59, when switch 55 is in the position shown in FIG. 4, the potential at the input of throttle control motor 84 is greater than it is when the switch is connected to source 59. Instead of maintaining the manifold vacuum at only one level (13 inches) under all conditions (other than when override switch 64 is operated), the manifold vacuum is maintained at either of two other levels, e.g., 12 inches or 14 inches. With switch 55 connected to source 57, the manifold vacuum is maintained at 12 inches. In effect, a small open-throttle bias is added into the feedback loop. The engine thus always delivers a little more power than it does during the vehicle operation described with reference to FIG. 3. Switch 55 is connected to source 57 whenever it is determined that the battery charge has reached the lower limit. The additional engine power automatically recharges the battery. Once switch 55 is connected to source 57, the battery continuously charges and discharges as depicted in FIG. 3, but because of the openthrottle bias, charging is favored. Under normal driving conditions, the average battery charge will gradually increase.

It may take many hours (especially in city driving) before the other extreme is reached, that is, where the average charging of the battery must be reduced. When this does finally happen, alarm 65 operates and now the driver connects switch 55 to source 59. With the new close-throttle bias, the engine delivers less power under the conditions discussed above with reference to FIG. 3, and the dynamotor supplies a little more power. The overall tendency of the battery is now to discharge, although once again under normal driving conditions it takes many hours before the battery reaches the other extreme condition at which time alarm 69 operates. When this happens, of course, the close-throttle bias is replaced by an open-throttle bias.

It will be recalled that while in the illustrative embodiment of the invention the manifold vacuum is maintained constant (it being understood that although the constant value may change after extended intervals depending upon the state of the battery, the manifold vacuum is constant over any extended period of time during which normal variations in vehicle speed are controlled), a purpose of maintaining a constant manifold vacuum is to insure that the ratio of the exhaust of the engine to the drive shaft speed remains substantially constant during normal operation of the vehicle. It is in this way that the ratio of exhaust gas to secondary air in the thermal reactor may be maintained constant. Although the ratio remains substantially constant for hours at a time, it is apparent that the ratio does change slightly depending on the throttle bias introduced by source 57 or source 59. However, the two different ratios are close enough such that the thermal reactor still substantially eliminates all emissions in both cases, it being recalled that there is a small range of ratios for which the reactor is completely effective.

It is also contemplated that additional throttle biases may be introduced to advantage, especially for improving fuel economy. It is believed that quite apart from controlling the constant manifold vacuum in accordance with the state of the battery, it may be advantageous to select three different manifold vacuum levels for urban, suburban and highway driving conditions. This could be controlled by an additional three-position switch which would introduce three respective bias levels at the input of throttle control motor 84. The driver would simply place the new switch in whichever position is appropriate for the type of driving in progress. If it is found that over the entire range of constant manifold vacuums the thermal reactor is not fully effective, it may be necessary to control the operation of the secondary air pump 33 in accordance with the type of driving in progress. The secondary air pump may still be driven by the engine shaft, but instead of providing a fixed gear ratio between the engine shaft and the secondary air pump shaft, the gear ratio might also assume different fixed values depending upon the constant manifold vacuum level which is selected so as to keep constant the ratio of exhaust gas to secondary air. The same switch (urban, suburban and highway) which determines the manifold vacuum level might also determine which of two or three gear ratios is used to couple the engine shaft to the air pump shaft.

Thus it is to be understood that in the context of our invention, the desired constant manifold vacuum is not a permanent value. In the long term, depending upon the state of the battery and the type of driving in progress, the desired constant value may change. But it is constant in the sense that during extended normal driving intervals — when the accelerator pedal may be depressed and released perhaps hundreds of times — the desired or pre-set constant value does not change.

As described above, alarm 65 is operated whenever the battery charge has reached the upper limit. This can be determined simply by measuring the battery voltage. Referring to FIG. 4, as will be described shortly, resistor 61 is only a few milliohms in magnitude. Even if the battery current is 300 amperes, the potential developed across resistor 61 is insignificant in comparison to the battery voltage. Thus the potential across battery 40 and resistor 61 in series is approximately equal to the potential of the battery alone. This potential is applied to the input of voltage sensing relay 63. This relay energizes only when the measured battery potential exceeds $1.2E_b$, that is, when the battery voltage is 20 percent greater than the nominal battery voltage. At this time relay 63 energizes so that alarm 65 operates. As soon as the driver switches contact 55 from source 57 to source 59, thus introducing a close-throttle bias, the battery charge, over the long term, will gradually decrease. To alert the driver to the alarm condition, a momentary audible alarm (not shown) may be sounded when relay 63 first energizes. Assuming alarm 65 to be a lamp, however, the lamp remains on, even after contact 55 switches to source 59, until the battery voltage drops slightly (below $1.2E_b$) and relay 63 de-energizes. It is also possible to control the lamp to turn off as soon as contact 55 is switched to source 59, even before relay 63 has de-energized. This may be accomplished, for example, by allowing the lamp (alarm 65) to operate only if relay 63 is energized and if contact 55 is connected to source 57. In such a case, the lamp would be extinguished as soon as contact 55 is switched to source 59. (Similarly, alarm 69 might be allowed to operate only if relay 67 is energized and contact 55 is connected to source 59.)

Alarm 69 is operated whenever the battery charge reaches the lower limit. As the battery charge is depleted, the terminal voltage of the battery falls. Voltage sensing relay 67 energizes to operate alarm 69 whenever the battery voltage falls below $0.8E_b$, that is, when the battery terminal voltage is only 80% of the nominal battery potential. However, it is not sufficient in this case simply to measure the terminal voltage of the battery. The battery necessarily has an internal impedance; although this impedance may be only a fraction of an ohm, the internal "IR" drop in the battery may be appreciable when very large currents flow from the battery. What is desired is a measure of the terminal potential when there is not current flowing through the battery, and a direct measurement of this kind may be difficult to achieve. For this reason, the current flowing through the battery is measured, and a potential is developed which is proportional to this current and which is a direct measure of the IR drop in the battery. This voltage is added to the measured terminal voltage and the sum represents what the terminal voltage would be in the absence of any current flow. It is the sum at the output of summer 72, which if it falls below $0.8E_b$, results in the energization of relay 67.

Resistor 61 is only a few milliohms in magnitude and thus only a very small voltage is developed across it. However, this voltage is proportional to the current flow through the battery. The potential across resistor 61 is amplified by inverting amplifier 71. The amplifier is inverting because the potential at the upper end of resistor 61 is negative when the battery is supplying power (at which time it is necessary to check for the lower limit), and a positive potential indicative of the internal IR drop of the battery is required. The gain of amplifier 71 is equal to the ratio of the internal impedance of the battery to the impedance of resistor 61. That is, the gain of the amplifier compensates for the fact that the magnitude of resistor 61 is only a small fraction of the internal impedance of the battery; the output of the amplifier when added to the actual terminal voltage of the battery in summer 72 produces an output which represents what the terminal voltage of the battery would be were there no current flow.

It is recognized, of course, that other state-of-the-battery control circuits can be employed instead of that shown in FIG. 4. The object of any such circuit is to bias the throttle such that either charging or discharging of the battery is favored (over the long term). In general, such a bias is necessary because of the difficulty in setting up the system so that for a single value of manifold vacuum the battery charge will never exceed either the upper or the lower limit even as the vehicle is driven for hundreds of miles.

Figure 5:
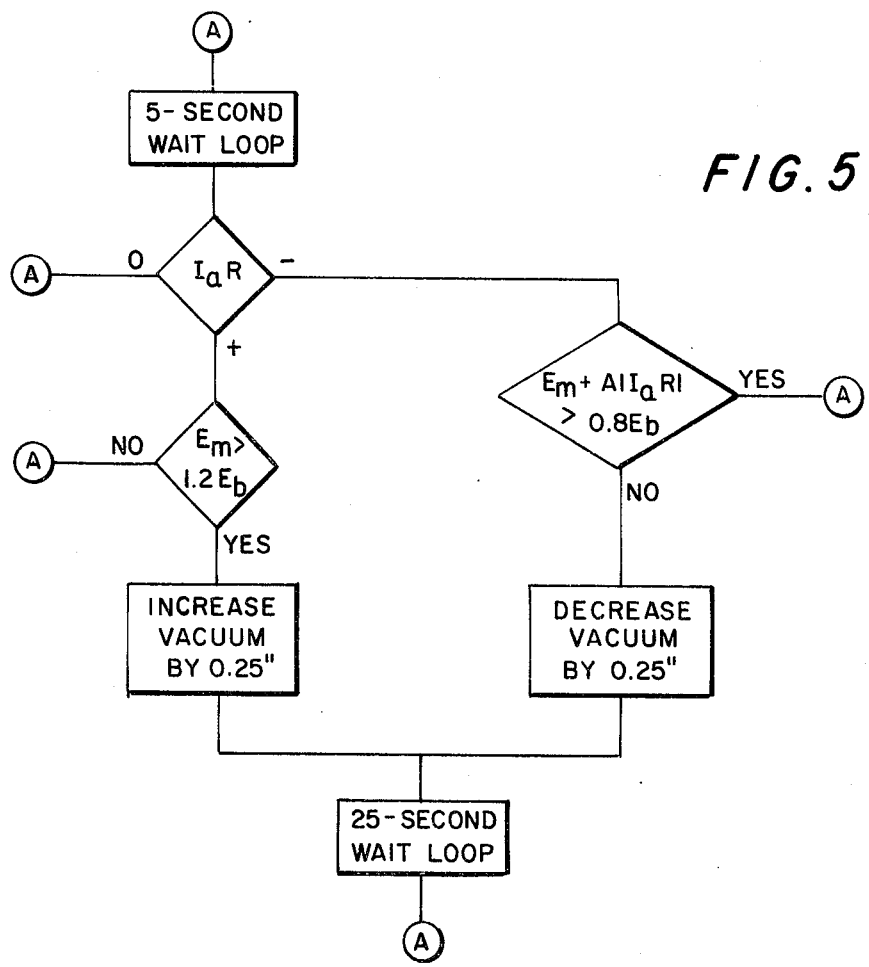
FIG. 5 depicts the manner in which the state-of-the-battery control feature may be automated.

FIG. 5 is a flow chart which illustrates a form of automatic control which obviates the need for the driver to manually move contact 55 between the two positions shown in FIG. 4. It has been proposed to provide a multi-purpose microprocessor in vehicles of the future for controlling numerous functions. One such function could be the adjustment of the throttle bias to favor charging or discharging of the battery over the long term, and FIG. 5 simply depicts a control sequence which could be employed and implemented by an on-board microprocessor.

After any action is taken, a 5-second wait loop is entered; during these 5 seconds, no tests on the state of the battery are made and the microprocessor would simply carry out whatever other functions are required of it. At the end of the 5-second wait loop, a test is performed to determine whether any current is flowing through the battery, and if it is, in which direction. The symbol $I_a$ represents the battery current and the symbol R represents an impedance such as resistor 61 in FIG. 4. If the voltage $I_aR$ developed across such a resistor is 0, it is an indication that no current is flowing through the battery, and no further action is required. Thus if $I_aR$ is 0, the system enters the 5-second wait loop once again.

If $I_aR$ is positive, indicating that current is flowing into the battery and that it is being charged, what must be checked is the overcharging of the battery. The measured voltage across the battery, $E_m$ (corresponding to the voltage sensed by relay 63 in FIG. 4), is compared to $1.2E_b$. If the measured voltage does not exceed $1.2E_b$, it is an indication that the battery is not excessively charged, and the system enters the 5-second wait loop once again. But if the measured battery voltage exceeds $1.2E_b$, it is an indication that charging should be reduced. This can be controlled automatically, as described above, simply by closing the throttle slightly (i.e., by increasing the manifold vacuum). The overall system might include a stepping motor having two input terminals. When one of the terminals is pulsed, the throttle might close by an incremental step sufficient to increase the vacuum by approximately 0.25 inch. When the other terminal is pulsed, the throttle might open slightly by an amount sufficient to decrease the vacuum by approximately 0.25 inch. As shown in FIG. 5, if it is determined that the charge in the battery has reached the upper limit, the manifold vacuum is increased by 0.25 inch (by pulsing the stepping motor). After this is done, the measured battery terminal voltage should drop. But in order to allow a sufficient time for the terminal potential to drop before performing another test, a 25-second wait loop is entered. Only after 25 seconds have elapsed does the system return to the initial 5-second wait loop, after which the basic test sequence is repeated. If after 30 seconds have elapsed following the incremental increase in manifold vacuum, the battery terminal voltage is still too high, the manifold vacuum is increased again by 0.25 inch. This process can be repeated several times if necessary until the measured voltage falls below $1.2E_b$. (It may be desirable to limit the maximum number of incremental increases in manifold vacuum even in the event that the measured battery voltage does not fall below $1.2E_b$ within a few minutes; similar remarks apply to the incremental steps for decreasing the manifold vacuum.) Once the manifold vacuum is increased sufficiently so that the terminal voltage falls below $1.2E_b$, in the usual case it will be several hours before any corrective action in the other direction is required, although the testing continues at 5-second intervals.

On the other hand, if the result of the initial $I_aR$ test is negative, that is, the battery is being discharged, then the measured terminal voltage $E_m$ is added to the absolute magnitude of $I_aR$, multiplied by a constant A. The constant A corresponds to the gain of amplifier 71 in FIG. 4. The sum of the two voltages represents what the terminal voltage of the battery would be were there no current flow, and this value is compared to $0.8E_b$. As long as the sum is greater than $0.8E_b$, no action is required and the system enters the 5-second wait loop. On the other hand, if the sum voltage is too low, the stepping motor is pulsed so as to decrease the manifold vacuum by approximately 0.25 inch. Thereafter, the system enters the 25-second wait loop, followed by the 5-second wait loop, and another test cycle ensues.

Thus far the manifold vacuum has been described as being kept at a constant value. It is to be understood that as in the case of any feedback system, what is meant by maintaining a parameter at a constant value is that any deviation in the parameter from that value results in a change in a direction which returns the parameter to the desired value. In our system, also, this kind of operation takes place. For example, when the accelerator pedal is depressed in order to accelerate the vehicle, the manifold vacuum necessarily increases. Only an infinitely fast feedback loop could prevent such a change and that of course cannot be achieved. The purposes of the feedback loop are (1) to return the manifold vacuum to the desired constant value (the faster the return, the lower the emissions), and (2) to ensure that the average manifold vacuum remains substantially equal to a pre-set value.

In one particular system which was constructed, during more than 95% of each normal driving interval, the manifold vacuum was maintained within 1 inch of the desired setting. This resulted in emissions which were below the 1977 standard for emissions of the Environmental Protection Agency.

In the system described above, the engine idles when the vehicle is at rest. However, it is also possible to provide a system in which the engine does not operate at all when the vehicle is at rest. (The starting of the vehicle is accomplished by the dynamotor, and it is for this reason that the engine can be shut off when the driver stops.) Obviously, when the engine is turned off, the manifold vacuum is not maintained at the desired value, nor is the feedback effective to return the manifold vacuum to the desired value. It is only when the vehicle is driven, i.e., when the engine is operated that the feedback is operative as well. Thus it is to be understood that, in the context of this disclosure, reference to the maintaining of any parameter at a constant level, or the control of the return of any parameter to a desired level, relates only to those normal periods of operation when the engine is actually operating.

Although the invention has been described above with reference to a vehicle, it is to be understood that our power system is not limited to use in vehicles. It is ideally suited for any application in which a variable mechanical load is to be driven by the engine shaft. Furthermore, although the system of our invention is ideally suited for eliminating emissions, our power system can be employed to advantage even in those cases where a reduction of emissions is not of paramount importance (even where the thermal reactor is omitted altogether). One of the main advantages of our invention is the exceedingly simple control of power flow to and from the dynamotor. And the automatic adjustment of the dynamotor operation, without the need for any of the complex controls which have characterized the prior art, is a distinct advantage quite apart from pollution considerations.

It is also to be emphasized that the use of a dynamotor is preferred because this single mechanism can function both as a generator and a motor. However, instead of a dynamotor, a separate generator and a separate motor may be employed, with a switch-over between motor and generator modes of operation being controlled by instantaneous power requirements. It should be noted that the accelerator pedal in the illustrative embodiment of the invention does indeed control the modes in which the system is operated, one mode being that in which power is drawn from the battery to aid the engine in the turning of the drive shaft and the other mode being that in which power is drawn from the drive shaft to recharge the battery. If a separate generator and a separate motor are employed, whatever means is used for controlling the mode in which the system is operated would simply cause either the generator or the motor to function in the system at any given time.

Although the invention has been described with reference to particular embodiments, it is to be understood that these embodiments are merely illustrative of the application of the principles of the invention. Numerous modifications may be made therein and other arrangements may be devised without departing from the spirit and scope of the application.

What we claim is:

1. A parallel hybrid power system comprising combustion engine means having air/fuel mixture intake means, an exhaust port for the exhaust of burned gases, and a drive shaft; battery means; a dynamotor having a shaft coupled by a fixed mechanical ratio to said drive shaft, armature winding means coupled to said battery means, and field-winding means, said dynamotor being selectively operable to draw power from said battery means to aid said engine means in the turning of said drive shaft and for drawing power from said drive shaft to recharge said battery means; speed control means coupled to said dynamotor field-winding means for varying the current flow therein; means for controlling the intake of air/fuel mixture by said engine means such that the ratio of exhaust of said engine means to the drive shaft speed remains substantially constant during normal operation of the power system as the current flow in said field-winding means is varied; thermal reactor means; means for directing the exhaust from said engine means to said thermal reactor means; and means coupled to and operated by said drive shaft for directing secondary air to said thermal reactor means at a rate which is directly proportional to the speed of said drive shaft.

2. A parallel hybrid power system in accordance with claim 1 further including means for varying the ratio of air to fuel in the air/fuel mixture taken in by said engine means, means for measuring the temperature of the burning gases in said thermal reactor means, and means for controlling the operation of said air to fuel ratio varying means to maintain a substantially constant temperature of the burning gases in said thermal reactor means.

3. A parallel hybrid power system in accordance with claim 2 wherein the operation of said intake controlling means is independent of the operation of said speed control means.

4. A parallel hydrid power system in accordance with claim 3 wherein said air/fuel mixture intake means includes an intake manifold and a carburetor having throttle means for adjusting the vacuum in said intake manifold, and said intake controlling means includes feedback means for detecting changes in the manifold vacuum from a predetermined value and means for positioning said throttle means such that the manifold vacuum is returned to said predetermined value.

5. A parallel hybrid power system in accordance with claim 4 further including means for selectively adjusting the value of said ratio which is maintained substantially constant by said intake controlling means in accordance with the state-of-change of said battery means.

6. A parallel hybrid power system in accordance with claim 1 further including means for varying the ratio of air to fuel in the air/fuel mixture taken in by said engine means, means for measuring the temperature of the burning gases in said thermal reactor means, and means for controlling the operation of said air to fuel ratio varying means to maintain a substantially constant temperature of the burning gases in said thermal reactor means.

7. A parallel hybrid power system in accordance with claim 6 wherein said air/fuel mixture intake means includes an intake manifold and a carburetor having throttle means for adjusting the vacuum in said intake manifold, and said intake controlling means includes feedback means for detecting changes in the manifold vacuum from a predetermined value and means for positioning said throttle means such that the manifold vacuum is returned to said predetermined value.

8. A parallel hybrid power system in accordance with claim 7 further including means for recirculating a portion of the exhaust gases from said thermal reactor means to said intake manifold.

9. A parallel hybrid power system in accordance with claim 1 wherein the operation of said intake controlling means is independent of the operation of said speed control means.

10. A parallel hybrid power system in accordance with claim 1 wherein said air/fuel mixture intake means includes an intake manifold and a carburetor having throttle means for adjusting the vacuum in said intake manifold, and said intake controlling means includes feedback means for detecting changes in the manifold vacuum from a predetermined value and means for positioning said throttle means such that the manifold vacuum is returned to said predetermined value.

11. A parallel hybrid power system in accordance with claim 1 further including means for selectively adjusting the value of said ratio which is maintained substantially constant by said intake controlling means in accordance with the state-of-charge of said battery means.

12. A parallel hybrid power system comprising combustion engine means having an intake manifold for the intake of an air/fuel mixture, an exhaust port for the exhaust of burned gases, and a drive shaft; battery means; motor-generator means having a shaft coupled by a fixed mechanical ratio to said drive shaft, winding means coupled to said battery means, and mode control means, said motor-generator means being selectively operable to draw power from said battery means to aid engine means in the turning of said drive shaft and for drawing power from said drive shaft to recharge said battery means in accordance with the operation of said mode control means; means for varying the intake of air/fuel mixture by said engine means such that the average manifold vacuum is maintained equal to a predetermined value during normal operation of the power system even as the speed of said drive shaft varies; and means for recirculating a portion of the exhaust gases to said intake manifold.

13. A parallel hybrid power system in accordance with claim 12 further including thermal reactor means, means for directing the exhaust from said engine means to said thermal reactor means, and means coupled to and operated by said drive shaft for directing secondary air to said thermal reactor means at a rate which is directly proportional to the speed of said drive shaft.

14. A parallel hybrid power system in accordance with claim 13 further including means for varying the ratio of air to fuel in the air/fuel mixture taken in by said engine means, means for measuring the temperature of the burning gases in said thermal reactor means, and means for controlling the operation of said air to fuel ratio varying means to maintain a substantially constant temperature of the burning gases in said thermal reactor means.

15. A parallel hybrid power system in accordance with claim 12 wherein the operation of said intake varying means is independent of the operation of said mode control means.

16. A parallel hybrid power system in accordance with claim 15 further including means for selectively adjusting said predetermined value of manifold vacuum in accordance with the state-of-charge of said battery means.

17. A parallel hybrid power system in accordance with claim 12 further including means for selectively adjusting said predetermined value of manifold vacuum in accordance with the state-of-charge of said battery means.

18. A parallel hybrid power system comprising combustion engine means having air/fuel mixture intake means, an exhaust port for the exhaust of burned gases, and a drive shaft; battery means; a dynamotor having a shaft coupled by a fixed mechanical ratio to said drive shaft, armature winding means coupled to said battery means, and field-winding means, said dynamotor being selectively operable to draw power from said battery means to aid said engine means in the turning of said drive shaft and for drawing power from said drive shaft to recharge said battery means; speed control means coupled to said dynamotor field-winding means for varying the current flow therein; thermal reactor means; means for directing the exhaust from said engine means exhaust port to said thermal reactor means; means coupled to and operated by said drive shaft for directing secondary air to said thermal reactor means; and means for controlling the intake by said engine means of air/fuel mixture such that the exhaust of said engine means directed to said thermal reactor means changes in direct proportion to the secondary air directed to said thermal reactor means during normal operation of the power system as the current flow in said field-winding means is varied.

19. A parallel hybrid power system in accordance with claim 18 further including means for varying the ratio of air to fuel in the air/fuel mixture taken in by said engine means, means for measuring the temperature of the burning gases in said thermal reactor means, and means for controlling the operation of said air to fuel ratio varying means to maintain a substantially constant temperature of the burning gases in said thermal reactor means.

20. A parallel hybrid power system in accordance with claim 19 wherein the operation of said intake controlling means is independent of the operation of said speed control means.

21. A parallel hybrid power system in accordance with claim 20 wherein said air/fuel mixture intake means includes an intake manifold and a carburetor having throttle means for adjusting the vacuum in said intake manifold, and said intake controlling means includes feedback for detecting changes in the manifold vacuum from a predetermined value and means for positioning said throttle means to return the manifold vacuum to said predetermined value.

22. A parallel hybrid power system in accordance with claim 21 further including means for selectively adjusting said predetermined value of manifold vacuum.

23. A parallel hybrid power system in accordance with claim 21 further including means for recirculating a portion of the exhaust gases from said thermal reactor means to said intake manifold.

24. A parallel hybrid power system in accordance with claim 18 wherein the operation of said intake controlling means is independent of the operation of said speed control means.

25. A parallel hybrid power system in accordance with claim 18 wherein said air/fuel mixture intake means includes an intake manifold and a carburetor having throttle means for adjusting the vacuum in said intake manifold, and said intake controlling means includes feedback means for detecting changes in the manifold vacuum from a predetermined value and means for positioning said throttle means to return the manifold vacuum to said predetermined value.

26. A parallel hybrid power system comprising combustion engine means having air/fuel mixture intake means an exhaust port for the exhaust of burned gases, and a drive shaft; battery means; motor-generator means having a shaft coupled to said drive shaft, winding means coupled to said battery means, and mode control means, said motor-generator means being selectively operable to draw power from said battery means to aid said engine means in the turning of said drive shaft and for drawing power from said drive shaft to recharge said battery means in accordance with the operation of said mode control means; means for controlling the intake of air/fuel mixture by said engine means such that the ratio of exhaust of said engine means to the drive shaft speed remains substantially constant during normal operation of the power system; thermal reactor means; means for directing the exhaust from said engine means to said thermal reactor means; and means coupled to and operated by said drive shaft for directing secondary air to said thermal reactor means at a rate which is directly proportional to the speed of said drive shaft.

27. A parallel hybrid power system in accordance with claim 26 further including means for varying the ratio of air to fuel in the air/fuel mixture taken in by said engine means, means for measuring the temperature of the burning gases in said thermal reactor means, and means for controlling the operation of said air to fuel ratio varying means to maintain a substantially constant temperature of the burning gases in said thermal reactor means.

28. A parallel hybrid power system in accordance with claim 27 wherein the operation of said intake controlling means is independent of the operation of said mode control means.

29. A parallel hybrid power system in accordance with claim 27 wherein said air/fuel mixture intake means includes an intake manifold and a carburetor having throttle means for adjusting the vacuum in said intake manifold, and said intake controlling means includes feedback means for detecting changes in the manifold vacuum from a predetermined value and means for positioning said throttle means to return the manifold vacuum to said predetermined value.

30. A parallel hybrid power system in accordance with claim 29 further including means for recirculating a portion of the exhaust gases from said thermal reactor means to said intake manifold.

31. A parallel hybrid power system in accordance with claim 27 further including means for selectively adjusting the value of said ratio which is maintained substantially constant by said intake controlling means in accordance with the state-of-charge of said battery means.

32. A parallel hybrid power system in accordance with claim 26 further including means for selectively adjusting the value of said ratio which is maintained substantially constant by said intake controlling means in accordance with the state-of-charge of said battery means.

33. A parallel hybrid power system in accordance with claim 28 further including means for varying the ratio of air to fuel in the air/fuel mixture taken in by said engine means, means for measuring the temperature of the burning gases in said thermal reactor means, and means for controlling the operation of said air to fuel ratio varying means to maintain a substantially constant temperature of the burning gases in said thermal reactor means.

34. A parallel hybrid power system in accordance with claim 33 wherein said air/fuel mixture intake means includes an intake manifold and a carburetor having throttle means for adjusting the vacuum in said intake manifold, and said intake controlling means includes feedback means for detecting changes in the manifold vacuum from a predetermined value and means for positioning said throttle means to return the manifold vacuum to said predetermined value.

35. A parallel hybrid power system in accordance with claim 26 wherein the operation of said intake controlling means is independent of the operation of said mode control means.

36. A parallel hybrid power system in accordance with claim 26 wherein said air/fuel mixture intake means includes an intake manifold and a carburetor having throttle means for adjusting the vacuum in said intake manifold, and said intake controlling means includes feedback means for detecting changes in the manifold vacuum from a predetermined value and means for positioning said throttle means to return the manifold vacuum to said predetermined value.

* * * * *